Figure 1:
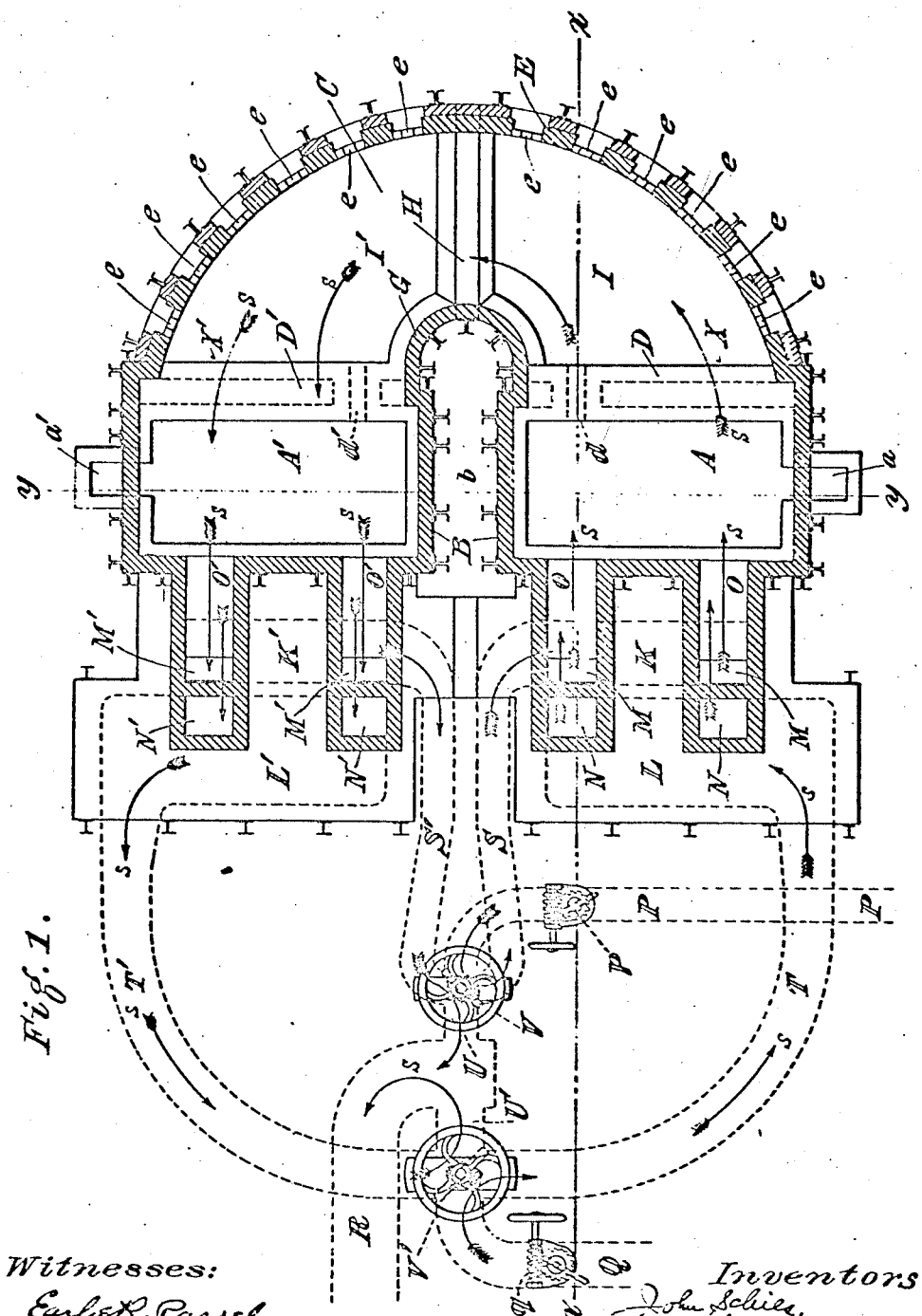

No. 895,206. PATENTED AUG. 4, 1908.
J. SCHIES & M. WYANT.
GLASS TANK FURNACE.
APPLICATION FILED SEPT. 6, 1907.

2 SHEETS—SHEET 1.

Witnesses: Inventors
By Attorney

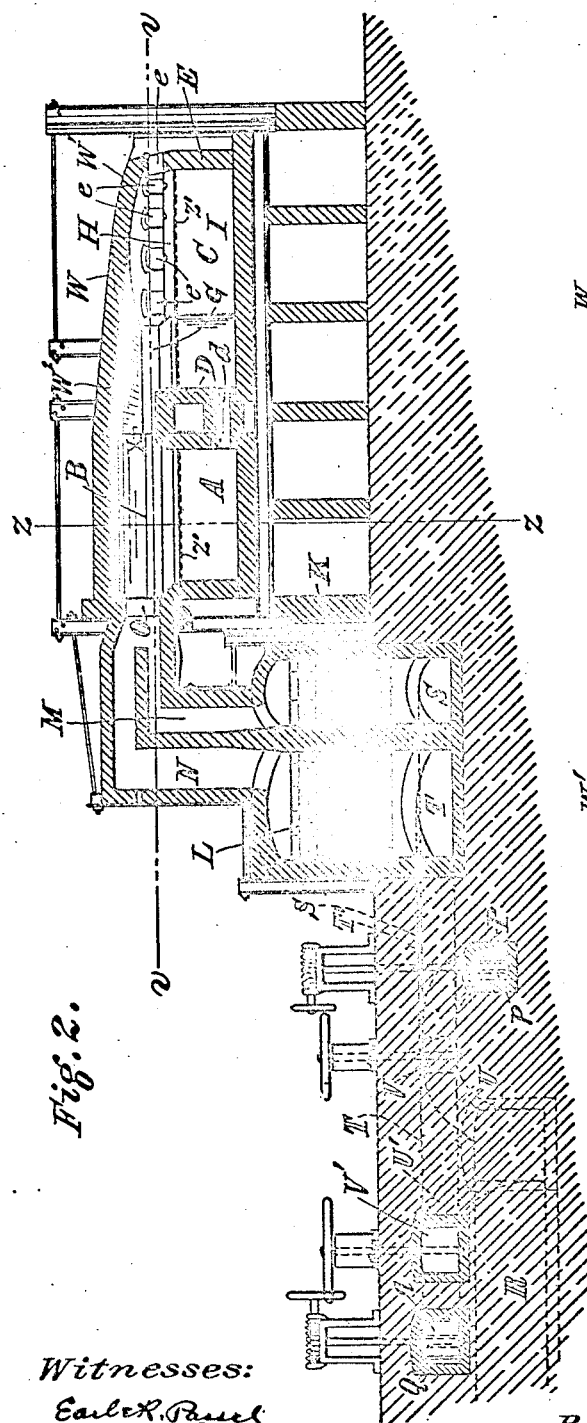
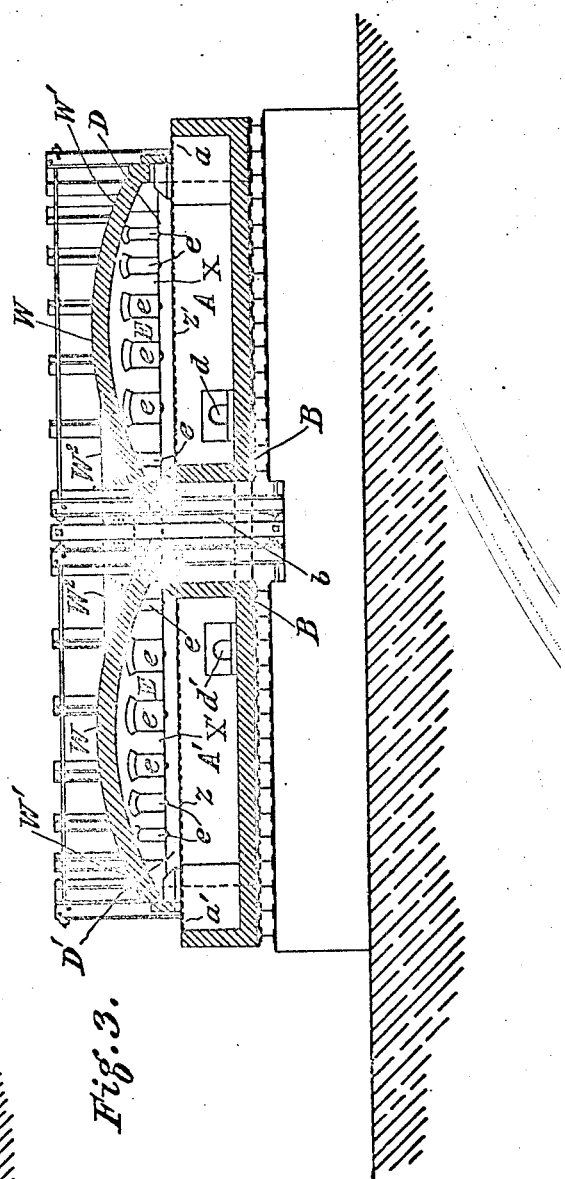

UNITED STATES PATENT OFFICE.

JOHN SCHIES AND MOTT WYANT, OF ANDERSON, INDIANA.

GLASS-TANK FURNACE.

No. 895,206.  Specification of Letters Patent.  Patented Aug. 4, 1908.

Application filed September 6, 1907. Serial No. 391,641.

*To all whom it may concern:*

Be it known that we, JOHN SCHIES and MOTT WYANT, citizens of the United States, residing at Anderson, in the county of Madison and State of Indiana, have jointly invented certain new and useful Improvements in Glass-Tank Furnaces, of which the following is a specification.

Our invention relates to glass tank furnaces and has for its object the providing of a furnace of this character capable of producing different kinds of glass, for instance, amber glass and flint glass, simultaneously under one fire; further in so arranging the melting chambers and working chamber as to permit the employment of a large number of working openings; which latter also has the advantage, when a plurality of kinds of glass is being produced, to serve each kind from a large number of openings for enabling large production to be had.

Our invention consists in providing a plurality of melting chambers and a working chamber arranged to the front of the collective melting chambers, in providing a heat deflector for said working chamber adjacent said melting chambers, in providing said working chamber with a plurality of glass-metal compartments, in providing regenerative heating chambers having openings into said melting chambers at one side of said collective melting chambers and arranging said melting chambers and working chamber for causing the heat to cross said melting chambers and said working chamber in substantially a curved sweep, and the invention will be further readily understood from the following description and claims, and from the drawings, in which latter:

Figure 1 represents a horizontal section of our improved device on a line corresponding to the line v—v of Fig. 2. Fig. 2 is a vertical section of the same on a line corresponding to the line x—x of Fig. 1. Fig. 3 is a vertical section of the same on a line corresponding to the line y—y of Fig. 1. For comparison and clearness this section line is also indicated at Z—Z of Fig. 2.

A A' represent melting chambers in which the raw material is melted, the raw material being fed through charging holes a a' which may if desired be closed in any suitable manner between chargings. These melting chambers are preferably arranged end to end with the wall B between them. They may also be separated by the space b.

C is the working chamber which is arranged in front of the melting chambers, from which its lower or glass-metal portion is separated by the walls D D', in which there are throats d d' for the glass-metal below the level of the glass-metal, the glass-metal in practice usually attaining a height in these glass chambers or tanks indicated by the dotted line Z' in Figs. 2 and 3.

E is the outer or serving wall of the working chamber, which is provided with working openings e, through which the glass-metal is taken from the melting chamber for subsequent operations. The glass blowers or other glass manipulating operators are usually positioned at the wall E or front of the furnace. A deflector-wall G is located adjacent the melting chambers and is preferably of curved form in its horizontal cross-section, with the curved portion extending into the working chamber. It is shown as extending forwardly of the wall B. The outer wall E preferably extends in a curving sweep in front of the working chamber to substantially the outer ends of the melting chambers.

W is the dome of the furnace. We prefer to provide the dome with an outer slope W', sloping toward the outer walls, and with an inner slope $W^2$, the latter serving as a continuation of the heat deflecting wall for properly deflecting and confining the currents in proper course, the construction forming a curved passage for the heat which is dome-shaped in cross-section.

If desired the lower or glass-metal containing part of the working chamber may be divided for forming a plurality of glass-metal compartments, which we have shown accomplished by the dividing wall H for forming the glass-metal compartments I I'. The construction and arrangement of our improved glass tank furnace permits a large number of working openings to be employed. The dividing wall H may be so placed as to divide the melting chamber into glass-metal compartments having an equal number of working openings, or the dividing wall may be so placed as to make one or the other compartment proportionately larger for providing each with a different number of working openings. The working chamber is shown at the front of the collective melting chambers, the fuel being supplied to rear of said melting chambers, the fuel openings also serving alternately as exhaust passages for the heat in the form shown.

K K' are regenerative chambers for the gas and L L' are regenerative chambers for the air, which chambers may contain suitable brick checker-work of ordinary construction for alternately receiving heat from the exhaust and imparting heat to the incoming fuel.

M M' represent the gas passages and N N' represent the air passages, which passages merge into the fuel ports O O' for conducting the mixed gas and air into the respective melting chambers, there being preferably a plurality of these gas and air passages and fuel ports for each melting chamber.

The fuel or gas and air may be supplied from any suitable source to the regenerators and the exhaust received therefrom in any suitable manner, suitable passages and valves being provided for determining the course of the currents of fuel and heat, or regulating the same, and we have exemplified an arrangement and means for accomplishing this, although these may be changed without departing from the spirit of our invention.

P shows a gas supply passage which may have a regulating valve $p$ therein.

Q shows an air supply passage which may have a regulating valve $q$ therein.

R is an exhaust passage, which may be the tunnel to a suitable stack for creating the proper draft for causing the currents of combustion to properly travel.

S S' represent gas passages to the gas regenerators, leading from the gas supply passage P.

T T' represent air passages to the air regenerators, leading from the air supply passage Q.

U is an opening between the gas passages S S' and the exhaust passage R, and U' is an opening between the air passages T T' and said exhaust passage.

V is a gas reversing valve for directing the gas selectively through the gas passages to the respective gas regenerators.

V' is an air reversing valve for directing the air selectively through the air passages to the respective air regenerators. Valves of any desirable construction may be employed. Suitable means are also provided for reversing the exhaust from these regenerators, that is to say, when the air and gas supply for one set of regenerators is opened the exhaust for the other set of regenerators is also opened for enabling the current of combustion to cross the melting chambers and the working chamber of the glass tank furnace. We have shown the reversal of exhaust accomplished by the valves V V'.

X X' represent spaces or passages between the respective melting chambers and the working chamber.

In operation, assuming that the mixed air and gas are passing through the passages M N, the fuel and heat will pass through the ports O across the melting chamber A, the space X, the working chamber C, the space X', the melting chamber A', thence through the ports O', the passages M' N', the regenerators K' L', for heating the latter, so that when the currents are reversed they may in turn heat the incoming fuel, and thence through the passages S' T' and the exhaust passage R, the fuel and heat following the course of the arrows $s$, the current, in the preferred form, crossing the melting chambers in substantially opposite directions and passing through the working chamber in substantially curved currents. When the fuel and heat have been passed a given time in the direction of the arrows, the reversing valves are reversed for causing the currents to pass in the reverse direction.

Having thus fully described our invention what we claim as new and desire to secure by Letters Patent is:

1. In a glass tank furnace, the combination of melting chambers arranged end to end, a working chamber to the front of said collective melting chambers having a substantially curved wall at its front opposite said melting chambers and a heat-deflector between said melting chambers and constructed and arranged for causing the heat to pass through said melting chambers simultaneously in opposite directions and through said working chamber in a substantially curved direction.

2. In a glass tank furnace, the combination of melting chambers arranged end to end, a heat-deflector therebetween, a working chamber to the front of said collective melting chambers at substantially the level of said melting chambers, said working chamber having a substantially curved wall at its front opposite said melting chambers and having a throat-connection for glass-metal with each of said melting chambers below the normal height of the glass-metal in all said chambers and constructed and arranged for causing the heat to pass through said melting chambers simultaneously in opposite directions and through said working chamber in a substantially curved direction.

3. In a glass tank furnace, the combination of stationary melting chambers arranged end to end and a stationary working chamber to the front of said collective melting chambers divided into a plurality of stationary compartments for the purpose specified, said working chamber having a substantially curved wall at its front opposite said melting chambers and a heat-deflector between said melting chambers and constructed and arranged for causing the heat to pass through said melting chambers simultaneously in opposite directions and through said working chamber in a substantially curved direction.

4. In a glass tank furnace, the combination, with a plurality of melting chambers, of a working chamber to the front of said melting chambers, and a heat deflector projecting into transverse vertical plane of said working chamber adjacent said melting chambers.

5. In a glass tank furnace, the combination of melting chambers, a working chamber arranged to the front of said collective melting chambers, a heat deflector between said melting chambers having an extension in said working chamber and means for causing the heat to cross said melting chambers simultaneously in different directions, said melting chambers and working chamber having connections for glass-metal between them, substantially as described.

6. In a glass tank furnace, the combination of melting chambers, a working chamber arranged to the front of said collective melting chambers, a heat deflector between said melting chambers having an extension in said working chamber and means for causing the heat to cross said melting chambers simultaneously in different directions, said working chamber divided into a plurality of glass-metal compartments, said compartments and melting chambers respectively having connection for glass-metal between them, substantially as described.

7. In a glass tank furnace, the combination with melting chambers, of a working chamber to the front of said collective melting chambers, and a heat deflector in transverse vertical plane of said working chamber adjacent said melting chambers and means for causing the heat to cross said melting chambers simultaneously in substantially opposite directions, the outer wall of said working chamber having working openings, said working chamber being between said openings and said melting chambers, substantially as described.

8. In a glass tank furnace, the combination of a plurality of melting chambers, and a working chamber, a heat deflector in the transverse plane of said working chamber adjacent said melting chambers, said working chamber having an outer wall provided with working openings, said working chamber arranged in curved form to the side of and extending substantially to the outer ends of said collective melting chambers, substantially as described.

9. In a glass tank furnace, the combination of a plurality of stationary melting chambers, a stationary working chamber to the front of said collective melting chambers, said working chamber having an outer wall substantially curved in horizontal cross-section and a heat-deflector between said melting chambers for causing the currents of heat to pass through said working chamber in a substantially horizontally curved direction, substantially as described.

10. In a regenerative glass tank furnace, the combination of a plurality of melting chambers, a plurality of regenerative chambers having openings therefrom disposed to one side of the transverse axis of said collective melting chambers, a working chamber disposed to the other side of said axis, a heat deflector extending into the transverse vertical plane of said working chamber adjacent said melting chambers, and constructed and arranged for causing the currents of fuel and heat to pass therethrough in reverse directions, substantially as described.

11. In a regenerative glass tank furnace, the combination of a plurality of melting chambers, a plurality of regenerative chambers having openings therefrom disposed to one side of the transverse axis of said collective melting chambers, and a working chamber disposed to the other side of said axis, and constructed and arranged for causing the currents of fuel and heat to pass therethrough in reverse directions, said working chamber having a wall therein for providing the same with a plurality of glass-metal compartments, said compartments respectively having connection with the glass-metal portions of said melting chambers, substantially as described.

12. In a regenerative glass tank furnace, the combination of a plurality of melting chambers, a plurality of regenerative chambers having openings therefrom disposed to one side of said collective melting chambers, and a working chamber to the other side of said collective melting chambers, said working chamber having an outer wall provided with a series of working openings, said series of working openings extending substantially the distance between the outer ends of said collective melting chambers, said working chamber being between said working openings and said melting chambers, substantially as described.

13. In a regenerative glass tank furnace, the combination of a plurality of melting chambers, a plurality of regenerative chambers having openings therefrom, disposed to one side of said collective melting chambers, a working chamber to the other side of said collective melting chambers, said working chamber having an outer wall provided with a series of working openings, said series of working openings extending substantially the distance between the outer ends of said collective melting chambers, said working chamber being between said working openings and said melting chambers, and a heat deflector between said melting chambers, substantially as described.

14. In a regenerative glass tank furnace, the combination of a plurality of melting chambers, a plurality of regenerative chambers having openings therefrom disposed to one side of said collective melting chambers, a working chamber disposed to the other side of said collective melting chambers, said working chamber having an outer wall provided with a series of working openings, said series of working openings extending substantially the distance between the outer ends of said collective melting chambers, and a dividing wall in said working chamber for dividing the same into a plurality of glass-metal compartments, substantially as described.

In testimony whereof, we have subscribed our names hereto in the presence of two subscribing witnesses.

JOHN SCHIES.
MOTT WYANT.

Witnesses:
G. F. McDONNELL,
MARY SCHIES.